Jan. 15, 1929.
J. F. RALEIGH
1,699,020
SHUTTER APPARATUS FOR RADIATORS
Filed Nov. 5, 1925
3 Sheets-Sheet 1
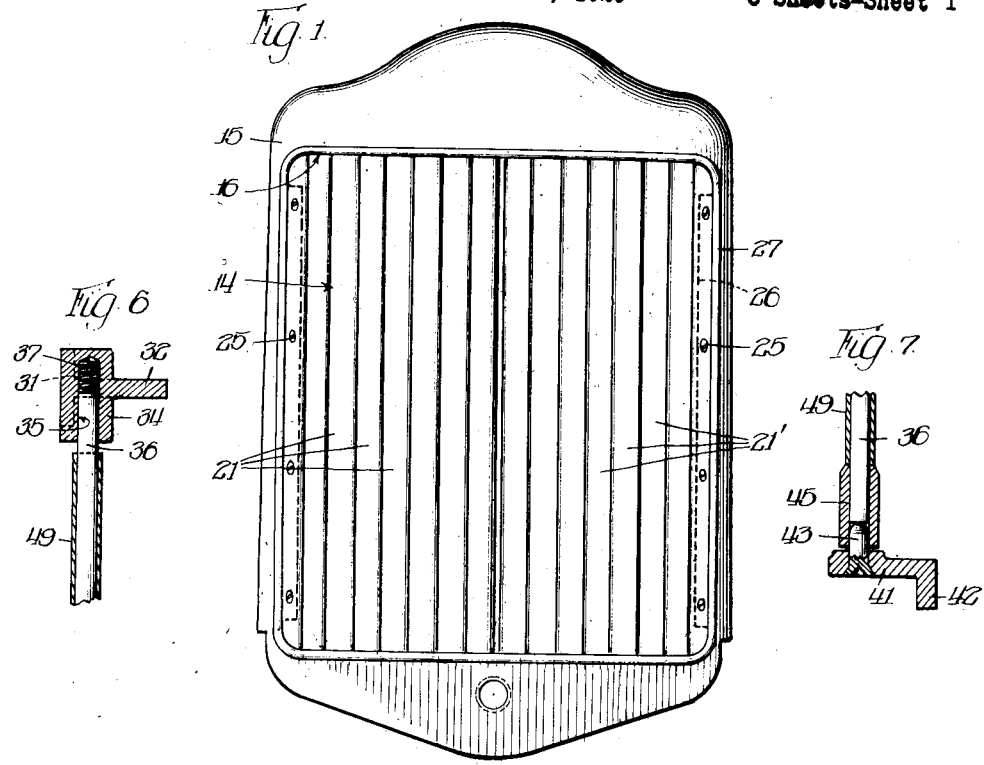
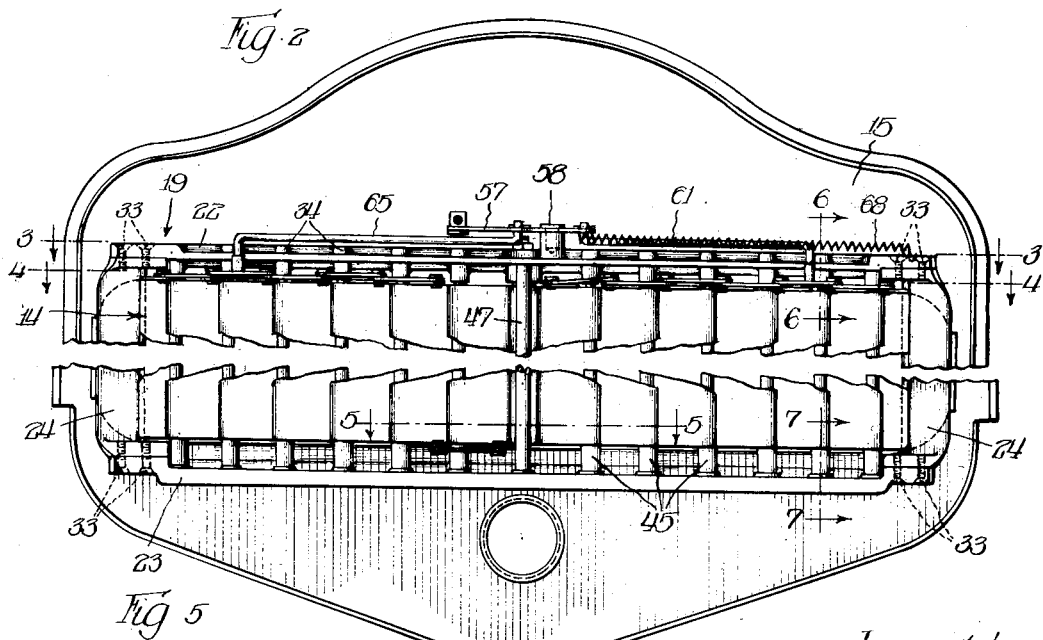
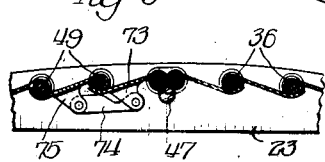

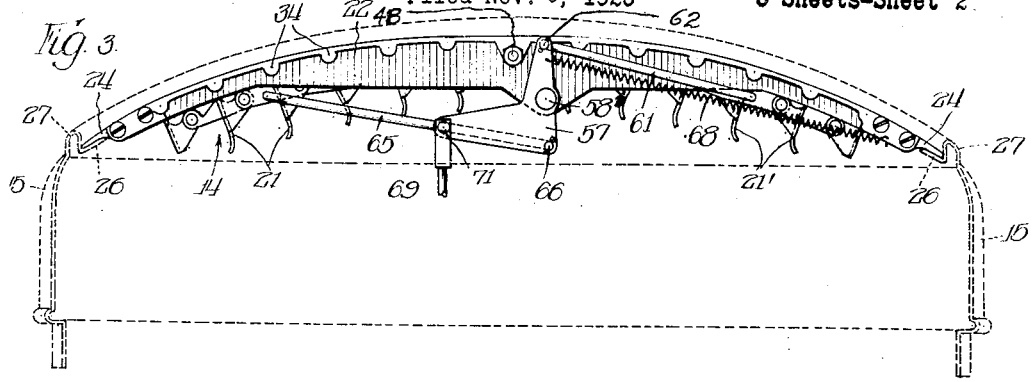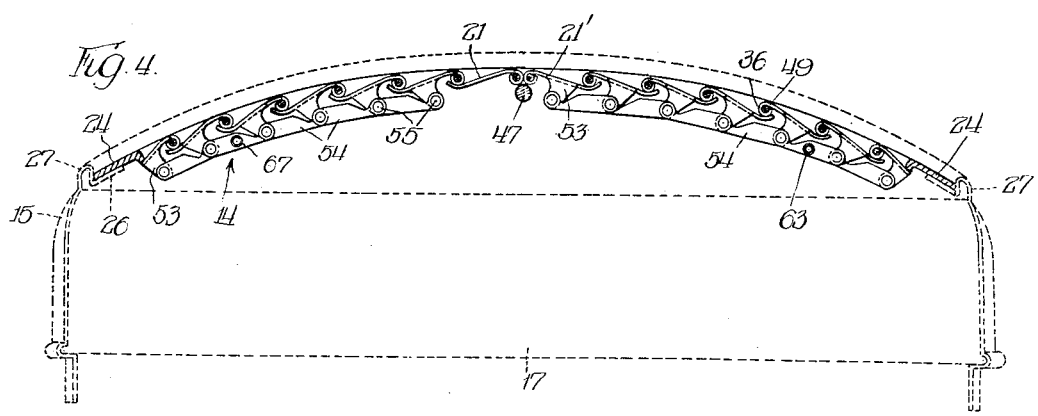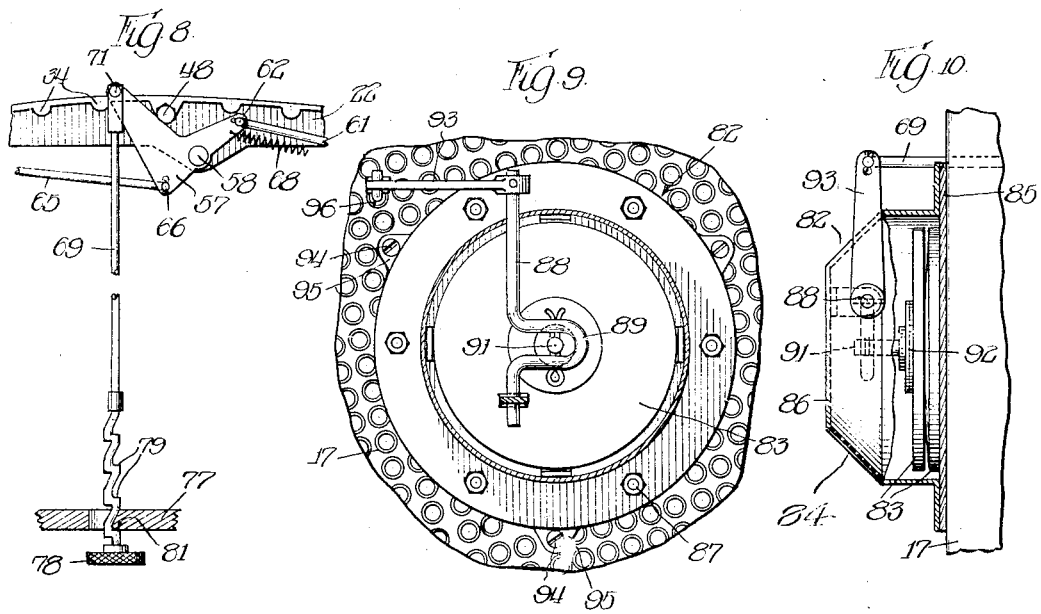

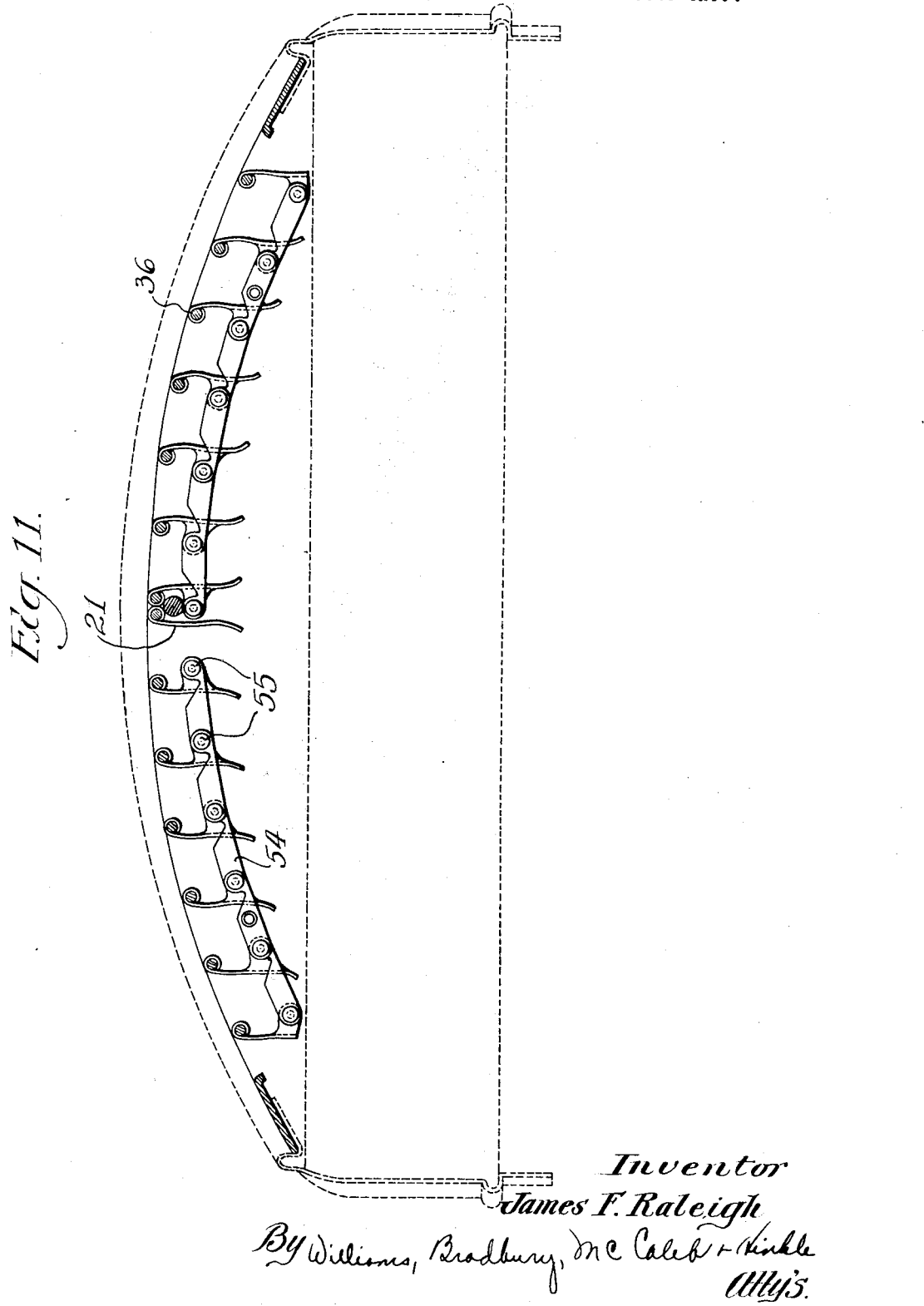

Patented Jan. 15, 1929.

1,699,020

UNITED STATES PATENT OFFICE.

JAMES F. RALEIGH, OF RIVER FOREST, ILLINOIS, ASSIGNOR TO PINES WINTER-FRONT COMPANY, OF CHICAGO, ILLINOIS, A CORPORATION OF DELAWARE.

SHUTTER APPARATUS FOR RADIATORS.

Application filed November 5, 1925. Serial No. 66,890.

The present invention relates to shutter apparatus adapted for use in connection with the radiator of an internal combustion engine, more particularly an automobile engine, for the purpose of regulating the amount of air that may pass through the radiator core so that the temperature of the cooling system will be maintained at a point most conducive to efficient engine operation.

One of the particular objects of the invention is to provide a radiator shutter apparatus in which the shutter elements are disposed on vertical axes.

Another object of the invention is to provide a shutter apparatus in which the outer face of the device has a curved outer surface, or sloping side surfaces, to give a curved or projecting contour to the front of the device.

The pivotal mounting of the individual shutter elements on vertical axes has particular cooperation with this outwardly curved or projecting contour of the device, as will hereinafter appear. Radiator shutter devices having this curved or projecting contour are in demand for certain makes of automobiles now employing curved or projecting designs of radiator shell or radiators.

Another object of the invention is to construct the present shutter apparatus with two sets of shutter elements disposed on opposite sides of a vertical median plane passing through the device and with both sets of shutter elements opening in opposite directions. This obtains uniform distribution of air flow across the entire area of the radiator core when the shutters are in open or partly open position; and also lends a more pleasing appearance to the entire device.

A further object is to so construct and operate the shutter elements that they will all lie in substantial parallelism when in full open position. This also assists in maintaining a uniform distribution of air flow across the entire area of the radiator core.

A further object is to construct the device with rattle-proof and dust-proof bearings for the shutter elements. A unique design of lower bearing carries the weight of each vertical shutter element with minimum friction, assuring easy operation of the device.

The present shutter apparatus can be adapted to manual or automatic control, and can be readily converted from one control to the other.

Referring now to the following description of a preferred embodiment of my invention taken in connection with the accompanying drawings in which:

Figure 1 is a front elevational view showing a shutter apparatus of my invention mounted in a typical radiator shell;

Figure 2 is a rear elevational view of the same on a larger scale with the middle portion thereof broken away.

Figures 3 and 4 are horizontal sectional views taken on the planes of the section lines 3—3 and 4—4 of Figure 2, the shutter apparatus of my invention being illustrated in full lines in these figures and the radiator and radiator shell being illustrated in dotted lines.

Figure 5 is a detailed sectional view taken on the plane of the line 5—5 of Figure 2;

Figure 6 is a detailed sectional view of the upper pivot or bearing employed for each shutter element, this view being taken approximately on the plane of the line 6—6 of Figure 2.

Figure 7 is a detailed sectional view of the lower pivot or bearing employed for each shutter element, this view being taken on the plane of the line 7—7 of Figure 2.

Figure 8 is a fragmentary view illustrating a typical form of manual control for manually operating the shutters from the dash board;

Figure 9 is a view partly in section, showing an automatic thermostatic unit mounted on the radiator core and operatively connected to the present shutter apparatus, and Figure 10 is the side view of this automatic thermostatic unit partly in section.

Figure 11 is a view similar to Figure 4 and shows the shutters in the open position.

Referring to Figure 1, the shutter apparatus of my invention is designated 14 in its entirety, this unit being detachably carried in a radiator shell designated 15 in its entirety. This shell has a large front opening or fenestration 16 in which is set the shutter apparatus 14. The side and top walls of this shell 15 extend back and enclose the radiator core represented in dotted lines at 17 in Figures 3 and 4.

The shutter apparatus 14 is all assembled in a four sided frame 19 in which are pivoted the two groups of shutter elements 21—21'. This frame 19 comprises upper and lower horizontal frame members 22 and 23 which are connected by vertical side members 24. The side members 24 comprise flanged portions which are secured by bolts or screws 25 to lateral flanges 26 formed on the shell 15 and defining the sides of the opening 16 (see Figures 3 and 4). A bead 27 may be formed in this shell 15 around the opening 16.

The upper and lower frame members 22 and 23 are shown as having a circular or projecting contour for giving a circular or projecting contour to the entire shutter unit. The upper frame member is illustrated in Figure 3 which clearly shows this convex curvature; it will be understood that much the same effect could be gained by sloping the sides of these frame members 22 and 23 to a central point to give a pointed or V-shaped contour, which contour I also consider as coming within the purview of my invention.

Referring to Figure 6, it will be seen that the upper frame member 22 comprises a vertically flanged portion 31, from the rear side of which extends a horizontal web 32. The extreme ends of this frame member are secured by screws 33 to the upper ends of the vertical frame members 24. Cast integral in this upper frame member 22 are a plurality of bearing bosses 34, spaced along the arcuate curvature of the flange 31 and extending above and below the web 32. Drilled in these bosses are bearing openings 35 into which extend the upper ends of rods 36 constituting the supporting pivots for the shutter elements 21—21'. Compression springs 37 are confined in the upper ends of these bearing openings above the ends of the rods 36 to place a slight downward pressure on each shutter element to prevent all possibility of rattle.

The lower frame member 23 has this same outward curvature but in cross section is preferably of the construction shown in Figure 7, comprising a horizontal web portion 41 reinforced by a vertical flange 42. The ends of this lower frame member 23 are also secured to the vertical frame members 34 by screws 33 (Figure 2). Pivot studs 43 having rounded or pointed ends are riveted or otherwise secured in this lower frame member, these pivot studs being secured at spaced points in this lower frame member directly below the bearing openings in the bearing bosses 34 of the upper frame member. The lower ends of the pivot rods 36 which carry the shutter elements, rest on the pointed upper ends of these pivot studs 43 and have short sleeves or bushings 45 secured thereto, which sleeves or bushings snugly engage over the pivot studs 43. By this construction, the rounded or pointed end of each pivot stud forms substantially a one point bearing contact for its representative shutter element, thereby providing a bearing of minimum friction. This one point bearing contact carries the pressure of the upper spring 37. The sleeve 45 on the lower end of each rod 36 forms a depending skirt portion which prevents the entrance of dust or dirt in the bearing surfaces.

The intermediate portions of the upper and lower frame members are held against any separating or converging movement which might affect the upper and lower bearings for the rods 36, by a long tie-rod 47 which passes through the upper and lower frame members directly in the center of the shutter unit. Nuts 48 screwing over the ends of this tie-rod secure the frame members thereto.

The shutter elements 21—21' each consist of a long strip of sheet metal fixedly secured to its respective rod 36 by wrapping or curling one end of the strap around the rod as indicated at 49. The free edge of this strip constitutes a vane adapted for swinging into and out of engagement with the rear side of the next adjacent shutter vane, these several shutter vanes thereby controlling the air flow through the opening 16. The free edge of each shutter vane is adapted to engage the rolled pivot edge 49 of the next adjacent shutter, and the edge of each vane is slightly curved as shown in Figure 5, to afford an extensive area of contact between the free edge of one vane and the rolled pivotal edge of the next adjacent vane for tight closing of the shutter surface. The two outermost shutter vanes have straight edges for contacting with the side members 24 of the frame.

The shutters are divided into two groups 21 and 21'. One group 21 controls the air flow through the right hand side of the device and the other group 21' controls the air flow through the left hand side of the device. The tie bolt 47 defines a median plane separating these two groups of shutter elements. As shown in Figures 3 and 4, the shutters 21' are pivoted to open by swinging inwardly with a clockwise motion and the shutters 21 are pivoted to open by swinging inwardly with a counter-clockwise motion. All of the shutters of the group 21 are linked together for simultaneous operation and all of the shutters of the group 21' are similarly linked together for simultaneous operation. As shown in Figures 2 and 4 the upper end of each shutter has a laterally turned pivot ear or lug 53 extending backwardly from the upper edge of the vane portion of the shutter. The outer ends of these pivot ears 53 are apertured for making a pivotal connection at 55 to links 54 which pivotally connect the successive shutters of each group. As shown in Figure 2, these links may be arranged alternately above and below each other in making pivotal connection to the pivot ears of the successive shutters, these links all lying below the web portion 32 of the upper frame member 22.

By separating the shutters into two groups and having them open with opposite directions of rotation as above described, a uniform distribution of air flow across the entire area of the radiator core is obtained. If all of the shutters opened with a rotating movement in the same direction there would be the likelihood of deflecting the major part of the air flow to one side of the radiator core when the shutters were in partly open position. To this same end of securing a uniform distribution of air flow across the area of the radiator core it is desirable that all of the shutter elements lie in substantial parallelism pointing straight back towards the radiator core 17 when the shutters are in wide open position. This is attained by giving the shutters which lie close to the center of the device a greater degree of opening movement than the shutters which are located near the outer edges of the device. This difference of angular movement is secured by locating the pivots 55 (which connect the links 54 with the apertured ears 53) somewhat closer to the pivotal centers 36 at the innermost shutters. That is to say, the shutters located near the center of the shutter apparatus have a shorter operating arm between the links 54 and pivotal centers 36 than do the shutters near the outer edges of the device, so that these innermost shutters will have a greater range of angular movement in moving to open position. This difference in the length of lever arm is distributed from the innermost shutters to the outermost shutters so that in wide open position all of the shutters will lie in substantially parallel planes pointing directly towards the radiator core 17.

A bell crank lever 57 is pivoted on a pivot pin 58 secured in a boss projecting upperwardly from the web portion 32 of the upper frame member 22. A long link or rod 61 is pivotally connected to one arm of this bell crank lever at 62, and at the other end is pivotally connected to the series of shutters 21'. This latter pivotal connection is preferably established by turning the end of the rod down into a tubular pivot socket 63 which is riveted to one of the links 54. A similar rod 65 has pivotal connection with the bell crank lever 57 at the pivot point 66, located diametrically opposite the pivot point 62; and the other end of this rod has like pivotal connection through a tubular pivot socket 67 with one of the links 54 of the other series of shutters. A long tension spring 68 is fastened at one end to the upper frame member 22 and at the other end is fastened to the outer arm of the bell crank lever 57 for normally holding both sets of shutters in closed position. The control of the shutters is effected through a rod 69 which has pivotal connection at 71 with the laterally extending arm of the bell crank lever 57.

Referring to Figure 4, it will be seen that the two innermost shutter elements 21 and 21' have their pivotal edges substantially contacting at the center of the device directly in front of the tie rod 47. The throw of the pivot ear 53 on the shutter 21' will be in back of and past the center of the tie rod 47. If the opposite shutter element 21 had a similar ear at this upper end it would strike the end of the pivot ear on the shutter 21' and prevent complete opening of the shutters. To obviate this interference I establish the pivotal connection between this innermost shutter 21 and the next adjacent shutter at the lower ends of the shutters.

Referring to Figure 5, which is a detailed sectional view at this lower end of the shutters, it will be observed that this innermost shutter 21 has a pivot ear 73 projecting from its lower end. This pivot ear has pivotal connection through the link 74 with a similar pivot ear 75 on the next adjacent shutter element 21. This latter shutter element 21 receives its operating movement through the upper series of links 54 and in turn transmits this movement to the innermost shutter element 21 through this lower linkage connection.

For manual operation the control rod 69 is extended back to the dash 77 of the car, where it carries an operating handle 78. For holding the shutters at different degrees of opening, the rod 69 may be provided with notches or offsets 79 adapted to have engagement with a suitable locking shoulder on the dash 77.

The present device can be readily converted to automatic control, utilizing thermostatic means responsive to the temperature of the cooling system for effecting its operation. A typical form of thermostat which may be employed for this purpose is indicated at 82 in Figures 9 and 10, this type of thermostatic unit being particularly adapted for direct mounting on the radiator core 17 so as to be responsive to the temperature of this core. The temperature responsive means comprises a plurality of hollow circular wafers 83, each containing a charge of ether or other temperature responsive fluid. These wafers are suitably supported in a housing 84 comprising a back plate 85 and a cup-shaped cover portion 86, detachably secured to the back plate 85 by bolts or screws 87. An operating shaft 88 is journaled in this cover portion 86, this shaft having a crank 89 bent therein to which the outer end of an operating stem 91 has pivotal connection. The expansive energy of the wafers 83 is transmitted to this stem through a pallet 92 on the end of the stem 91, against which pallet the outer wafer 83 bears. An arm 93 is adjustably secured to the upper end of the shaft 88 and this arm has pivotal connection at its end to the control rod 69. The entire thermostatic unit 82 is preferably mounted on the rear side of the radiator core 17 at a point convenient for making attachment to the control rod 69. A simple manner of mounting this thermostatic unit on the radiator core is to pass long slender bolts or screws 94 through ears 95 on the thermostatic housing and through holes in the cellular radiator core 17. The control rod 69 also passes though an opening 96 in the radiator core or in the radiator water box for connection with the actuating arm 93.

In the operation of this embodiment it will be obvious that the expansive energy of the thermostatic wafers, upon pre-determined rise of temperature in the radiator core 17, will rotate the shaft 88 and arm 93 and open the shutters 21—21'. When the temperature of the cooling system falls below a pre-determined point, the contraction of these thermostatic wafers will permit the spring 68 to close the shutters 21—21'.

It will be seen from the foregoing that by mounting the shutters on vertical axes and operatively connecting the successive shutters by short pivot links the pivotal centers of these shutters can be set off along an arc, or along a curved line of irregular curvature, or along converging lines arranged in a V, for giving any desired projecting contour to the front of the shutter apparatus.

The mounting of the shutters on vertical axes also has the decided advantage of avoiding lateral bearing wear. In the case of cheap cars, subject to considerable vibration, this lateral bearing wear and consequent rattle is very objectionable. By the present construction vibration has to lift the weight of the entire shutter and overcome the tension of the upper spring 37, to produce any play. As wear occurs between the rod 36 and the pointed bearing member 43, the spring 37 automatically takes up this wear.

The disposal of the shutters on an arc, or in V-shaped arrangement is also advantageous for admitting a greater volume of air when the wind is blowing laterally or at an angle relative to the car.

Having thus described my invention, what I claim is:

1. In radiator shutter apparatus, a pair of oppositely disposed supporting members, a plurality of shutters pivotally mounted between said supporting members, said shutters when closed defining an outer surface having its intermediate portion extending outwardly and away from the radiator, and links pivotally connecting the adjacent shutters, said links transmitting different degrees of rotative movement to said shutters to dispose all of said shutters in substantially parallel planes when in open position.

2. In a radiator shutter apparatus, a pair of curved oppositely disposed supporting members, a plurality of shutters pivotally mounted between said supporting members and a plurality of links connecting said shutters for actuating same to substantially parallel open position, said links being connected to said shutters at different distances from the pivots of said shutters.

3. In a radiator shutter apparatus, a pair of outwardly curved, oppositely disposed supporting members, a plurality of shutters pivotally mounted between said supporting members, actuating arms on said shutters decreasing in length toward the centrally located shutters on said curved supporting members, and means for connecting said arms for simultaneous actuation.

4. In a radiator shutter apparatus, the combination of a frame comprising upper and lower frame members, bearings for the upper ends of said shutters, pointed bearing studs extending upwardly from said lower frame member, cylindrical studs projecting downward from said shutters and having a flat surface resting on said pointed studs, said studs having a substantially one point bearing contact, and sleeves depending from said shutter and enclosing said studs.

5. In a radiator shutter apparatus, the combination of a frame comprising upper and lower frame members, bearings for the upper ends of said shutters, bearing studs having hemispherical ends extending upwardly from said lower frame member, cylindrical studs depending from said shutters, said studs having a substantially one point bearing contact, sleeves depending from said shutter and enclosing said studs and resilient means to hold said studs in contact.

In witness whereof, I hereunto subscribe my name this 21st day of October, 1925.

JAMES F. RALEIGH.